(12) United States Patent
Smith (10) Patent No.: US 11,074,603 B1
(45) Date of Patent: Jul. 27, 2021

(54) PROMOTION PROCESSING SYSTEM INCLUDING GEOGRAPHIC ZONE BASED DIGITAL PROMOTION ADJUSTMENT VIA CHATBOT AND RELATED METHODS

(71) Applicant: Inmar Clearing, Inc., Winston-Salem, NC (US)

(72) Inventor: Zackary Smith, Seattle, WA (US)

(73) Assignee: INMAR CLEARING, INC., Winston-Salem, NC (US)

( * ) Notice: Subject to any disclaimer, the term of this patent is extended or adjusted under 35 U.S.C. 154(b) by 11 days.

(21) Appl. No.: 16/752,876

(22) Filed: Jan. 27, 2020

(51) Int. Cl.
*G06Q 30/02* (2012.01)
*G06Q 30/06* (2012.01)

(52) U.S. Cl.
CPC ..... *G06Q 30/0224* (2013.01); *G06Q 30/0205* (2013.01); *G06Q 30/0212* (2013.01); *G06Q 30/0607* (2013.01)

(58) Field of Classification Search
CPC ...................................................... G06Q 30/02
See application file for complete search history.

(56) References Cited

U.S. PATENT DOCUMENTS

| | | | |
|---|---|---|---|
| 9,483,567 B2 * | 11/2016 | Campbell | G06F 16/9537 |
| 10,755,297 B1 * | 8/2020 | Smith | G06Q 30/0225 |
| 2006/0026067 A1 | 2/2006 | Nicholas et al. | |
| 2014/0006129 A1 * | 1/2014 | Heath | G06Q 30/0222 705/14.23 |
| 2014/0006163 A1 | 1/2014 | Sengupta et al. | |
| 2019/0325480 A1 * | 10/2019 | Suzuki | G01C 21/3476 |

FOREIGN PATENT DOCUMENTS

| | | | |
|---|---|---|---|
| WO | 2007059295 A1 | 5/2007 | |
| WO | WO 2012/167191 A1 * | 12/2012 | ............. G06Q 30/00 |
| WO | 2018034494 A | 2/2018 | |
| WO | 2018214163 A1 | 11/2018 | |

OTHER PUBLICATIONS

Yen, J.; Hu, J.; Bui, T.X., Intelligent Clearinghouse: electronic marketplace with computer-mediated negotiation supports (English), Proceedings of the 33rd Annual Hawaii International Conference on System Sciences (pp. 10pp. vol. 2), Jan. 1, 2000 (Year: 2000).*

* cited by examiner

*Primary Examiner* — Marilyn G Macasiano
(74) *Attorney, Agent, or Firm* — Allen, Dyer, Doppelt + Gilchrist, P.A.

(57) ABSTRACT

A promotion processing system may include a user device associated with a given user and geographically spaced apart communications servers each executing a respective chatbot. A promotion processing server may determine a first geographic zone of the given user based upon communications between the user device and a first geographically spaced apart communications server, and generate and communicate a digital promotion to the user device via a first chatbot. The digital promotion may have a redemption parameter based on the first geographic zone. The promotion processing server may determine a second geographic zone of the given user based upon communications between the user device and a second geographically spaced apart communications server, and determine whether the redemption parameter is valid in the second geographic zone, and when not, adjust the redemption parameter and communicate the digital promotion with the adjusted redemption parameter to the user device via a second chatbot.

24 Claims, 7 Drawing Sheets

PROMOTION PROCESSING SYSTEM INCLUDING GEOGRAPHIC ZONE BASED DIGITAL PROMOTION ADJUSTMENT VIA CHATBOT AND RELATED METHODS

TECHNICAL FIELD

The present invention relates to the field of electronics, and more particularly, to chatbot based communications and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

An electronic messenger program or instant messenger is a computer program that permits real time text transmission over a computer network, for example, the Internet. One type of electronic messenger program or instant messenger is a chat or messenger bot, which is a computer program that provides conversation, for example, by way of text. The conversation may mimic human conversation. A messenger bot may be particularly useful for customer service or information acquisition applications.

SUMMARY

A promotion processing system may include a user device associated with a given user, and a plurality of geographically spaced apart communications servers each configured to execute a respective chatbot. The promotion processing system may also include a promotion processing server configured to determine a first geographic zone of the given user based upon communications between the user device and a first one of the plurality of geographically spaced apart communications servers. The promotion processing server may be configured to generate and communicate a digital promotion to the user device via a first chatbot. The digital promotion may have a redemption parameter based on the first geographic zone. The promotion processing server may be configured to determine a second geographic zone of the given user based upon communications between the user device and a second one of the plurality of geographically spaced apart communications servers. The promotion processing server may also be configured to determine whether the redemption parameter of the digital promotion is valid in the second geographic zone, and when not, adjust the redemption parameter and communicate the digital promotion with the adjusted redemption parameter to the user device via a second chatbot.

The digital promotion may be redeemable toward an age-restricted product for purchase. The promotion processing server may be configured to determine whether the redemption parameter is valid in the second geographic zone based upon the age-restricted product for purchase, for example. The age-restricted product for purchase may include at least one of alcohol, tobacco, medication, and cannabis, for example.

The promotion processing server may be configured to determine the first and second geographic zones based upon a geographic location of the plurality of geographically spaced apart communications servers. The promotion processing server may be configured to determine the first and second geographic zones based upon respective network addresses, for example.

The second chatbot may be configured to continue a chatbot conversation from the first chatbot, for example. The redemption parameter may include a redemption value, for example.

The redemption parameter may include a companion product purchase requirement. The redemption parameter may include a promotion deletion parameter, for example.

The digital promotion may be redeemable toward a product for purchase. The redemption parameter may include a size of the product for purchase, for example.

A method aspect is directed to a method of processing a promotion. The method may include using a promotion processing server to determine a first geographic zone of a given user based upon communications between a user device associated with the given user and a first one of a plurality of geographically spaced apart communications servers. The plurality of geographically spaced apart communications servers may each be configured to execute a respective chatbot. The method may also include using the promotion processing server to generate and communicate a digital promotion to the user device via a first chatbot. The digital promotion may have a redemption parameter based on the first geographic zone. The method may further include using the promotion processing server to determine a second geographic zone of the given user based upon communications between the user device and a second one of the plurality of geographically spaced apart communications servers, and determine whether the redemption parameter of the digital promotion is valid in the second geographic zone, and when not, adjust the redemption parameter and communicate the digital promotion with the adjusted redemption parameter to the user device via a second chatbot.

A computer readable medium aspect is directed to a non-transitory computer readable medium for processing a promotion. The non-transitory computer readable medium includes computer executable instructions that when executed by a processor cause the processor to perform operations. The operations may include determining a first geographic zone of a given user based upon communications between a user device associated with the given user and a first one of a plurality of geographically spaced apart communications servers. The plurality of geographically spaced apart communications servers may each be configured to execute a respective chatbot. The operations may further include generating and communicating a digital promotion to the user device via a first chatbot. The digital promotion may have a redemption parameter based on the first geographic zone. The operations may further include determining a second geographic zone of the given user based upon communications between the user device and a second one of the plurality of geographically spaced apart communications servers, and determining whether the redemption parameter of the digital promotion is valid in the second geographic zone, and when not, adjusting the redemption parameter and communicating the digital promotion with the adjusted redemption parameter to the user device via a second chatbot.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
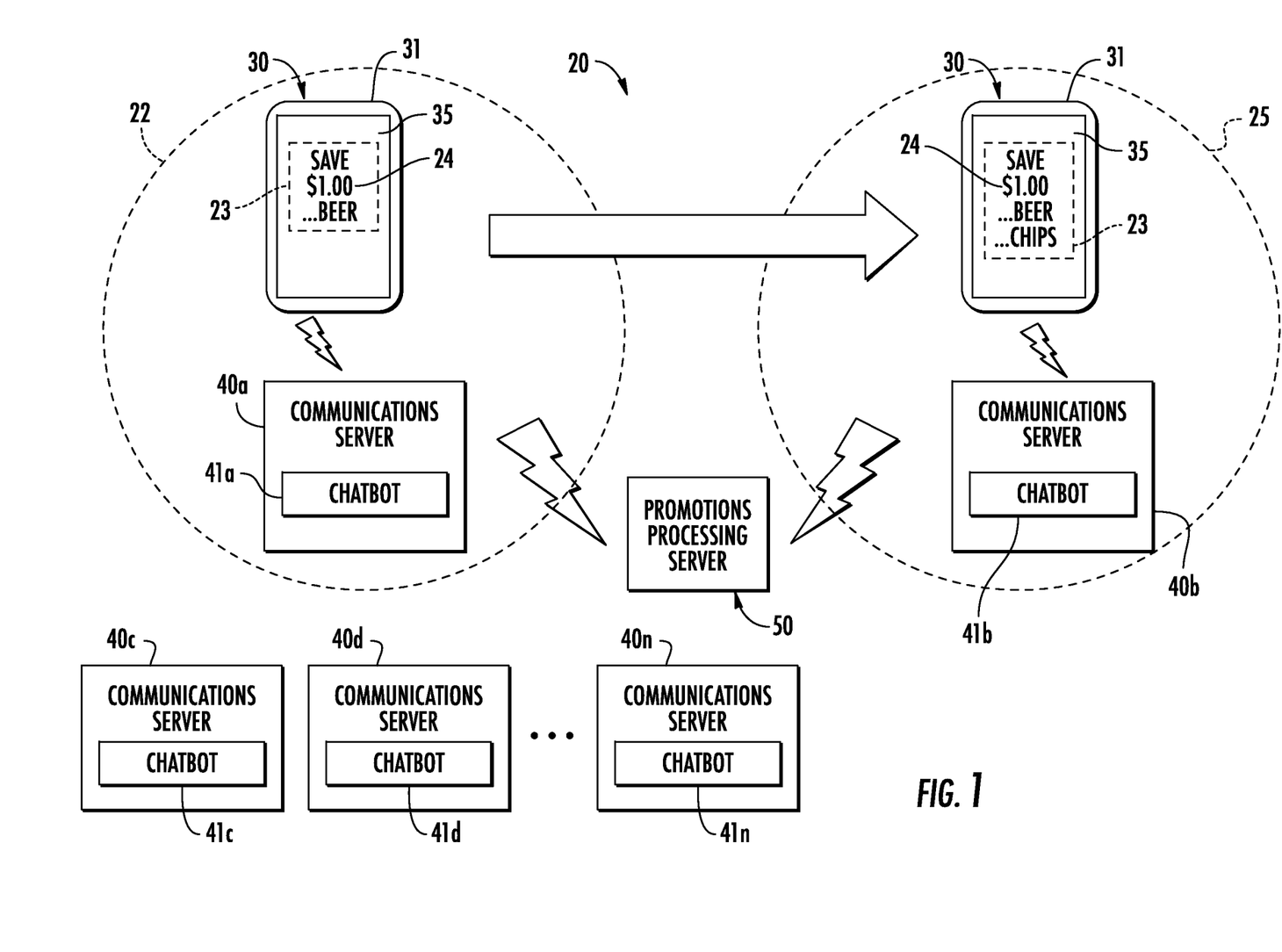
FIG. 1 is a schematic diagram of a promotion processing system in accordance with an embodiment.
Figure 2A:
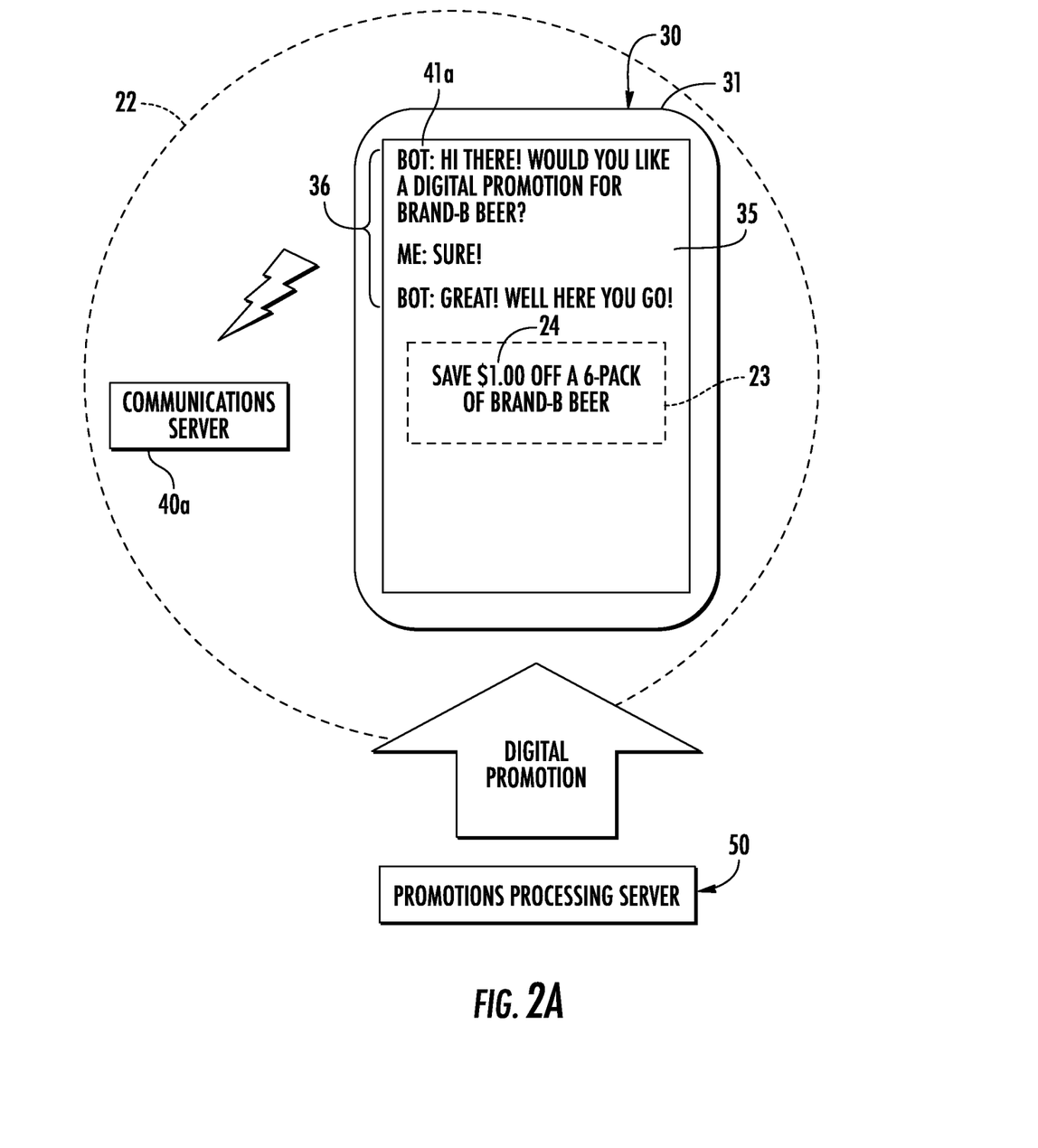
FIG. 2a is a more detailed schematic diagram of a portion of the system of FIG. 1.
Figure 2B:
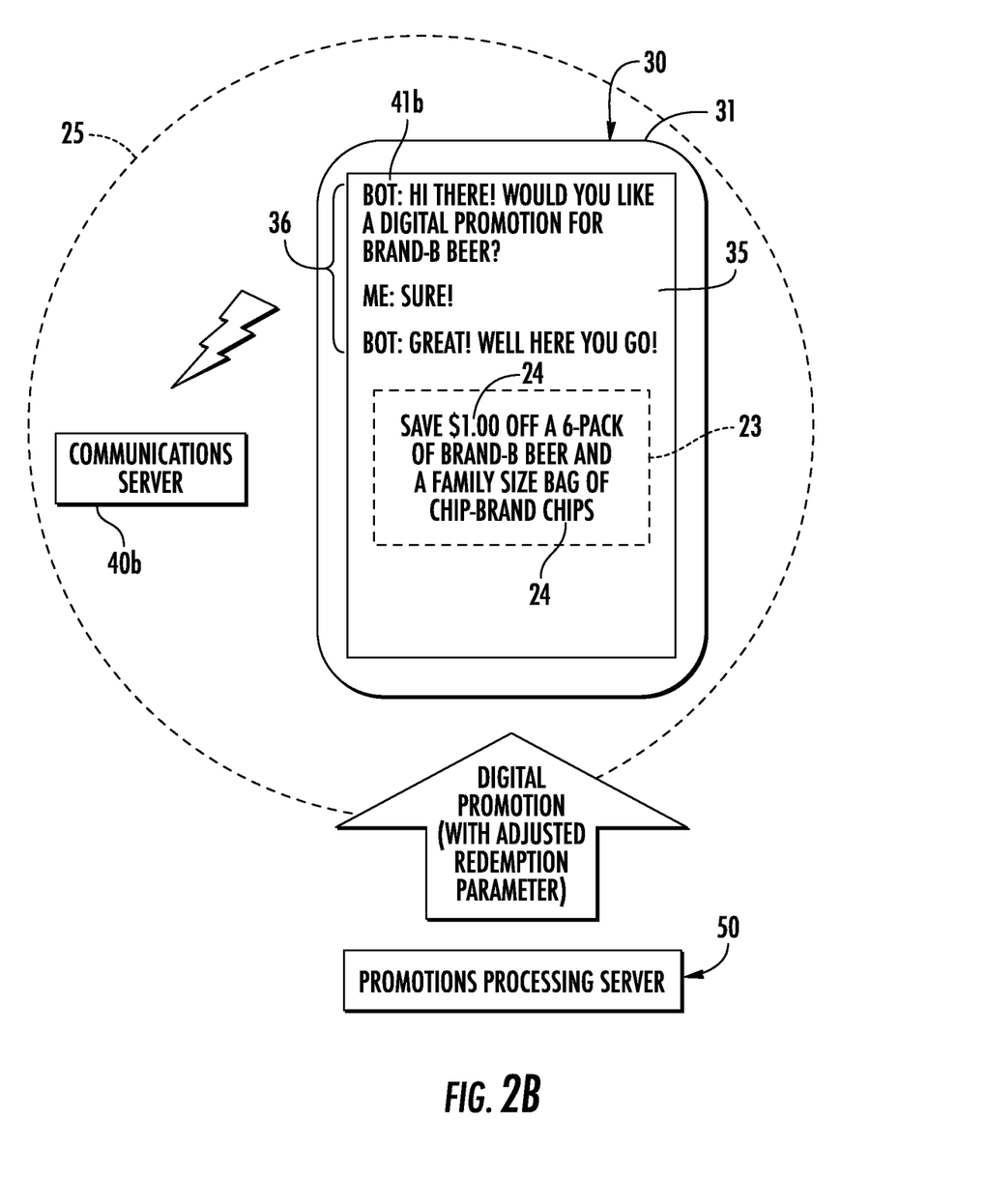
FIG. 2b is another more detailed schematic diagram of another portion of the system of FIG. 1.
Figure 3:
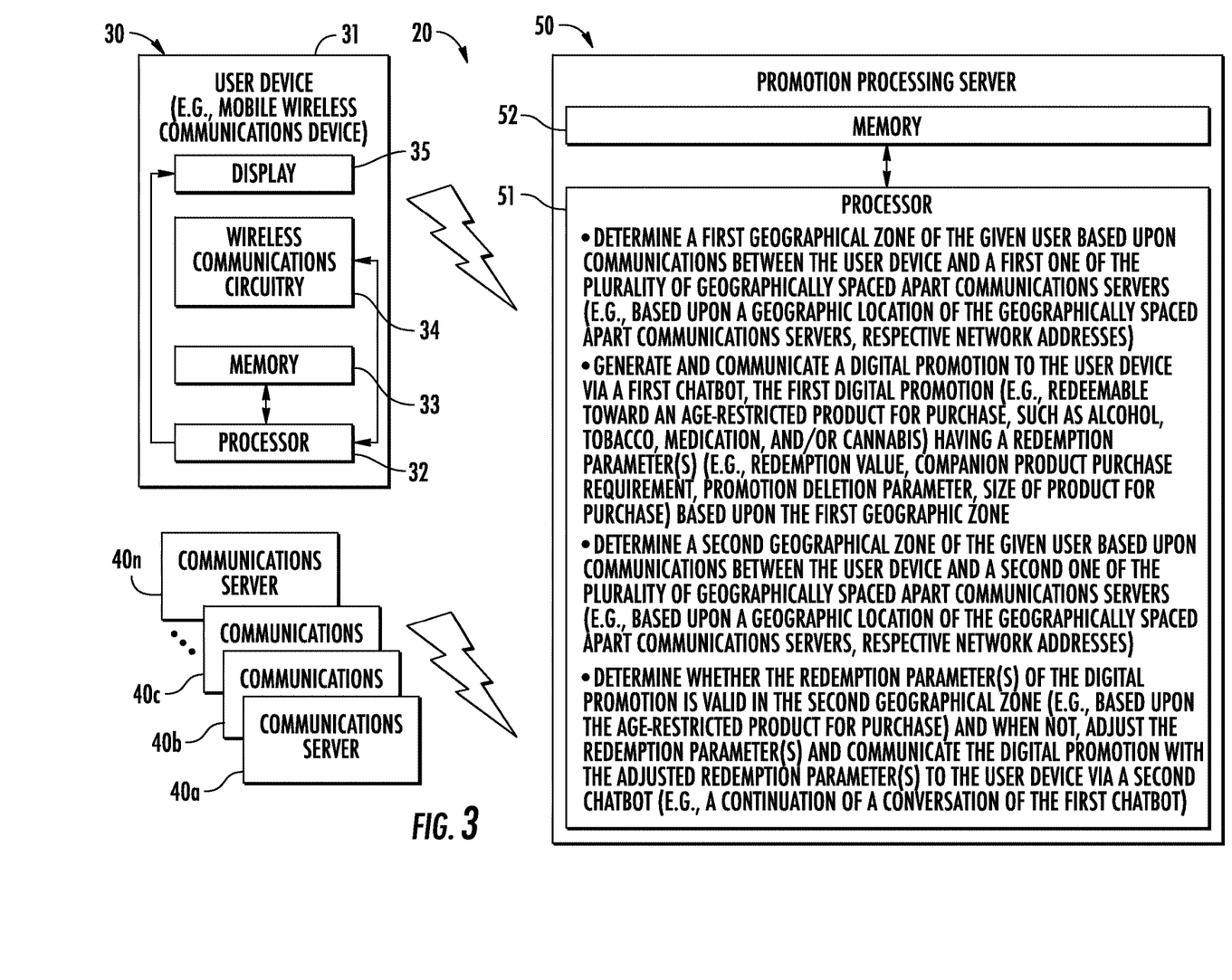
FIG. 3 is a schematic block diagram of a promotion processing system in accordance with an embodiment.

Referring initially to FIGS. 1-3, a promotion processing system 20 illustratively includes a user device 30 associated with a given user. The user device 30 is illustratively in the form of a mobile wireless communications device or smartphone. The mobile wireless communications device 30 illustratively includes a portable housing 31, a mobile device processor 32, a mobile device memory 33 coupled to the mobile device processor, and wireless communications circuitry 34 coupled to the mobile device processor. The mobile wireless communications device 30 also includes a display 35, such as, for example, a touch display, carried by the portable housing 31 and coupled to the mobile device processor 32. The mobile wireless communications device 30 may include one or more input devices, for example, a camera and other types of output devices. The mobile wireless communications device 30 may be a mobile phone or smartphone, a tablet computer, or other type of mobile wireless communications device, as will be appreciated by those skilled in the art.

The system 20 also includes geographically spaced apart communications servers 40a-40n each configured to execute a respective chatbot 41a-41n, for example, an instance of the chatbot, as will be appreciated by those skilled in the art. Each chabot 41a-41n, for example may be associated with a given product or brand of products. The chatbot 41a-41n may be implemented in the form of a two-way dialog box that permits the given user to communicate by way of typing (i.e., written communication). In some embodiments, the chatbot 41a-41n may operate through voice commands or spoken words.

The chatbot 41a-41n is operated by the spaced apart communications servers 40a-40n on the mobile wireless communications device 30 to communicate a dialog with the given user for display on the display 35 of the mobile wireless communications device. Those skilled in the art will appreciate that communications with the chatbot 41a-41n may be initiated by way of user input (e.g., via a prompt, clicking on an icon or link, etc., which may be within an application) to the mobile wireless communications device 30. In some embodiments, the chatbot 41a-41n may self-initiate through an application.

The promotion processing system 20 also includes a promotion processing server 50. The promotion processing server 50 includes a processor 51 and a memory 52 coupled to the processor. While operations of the promotion processing server 50 are described herein, it should be understood that the operations are performed through cooperation between the processor 51 and the memory 52.

Figure 4:
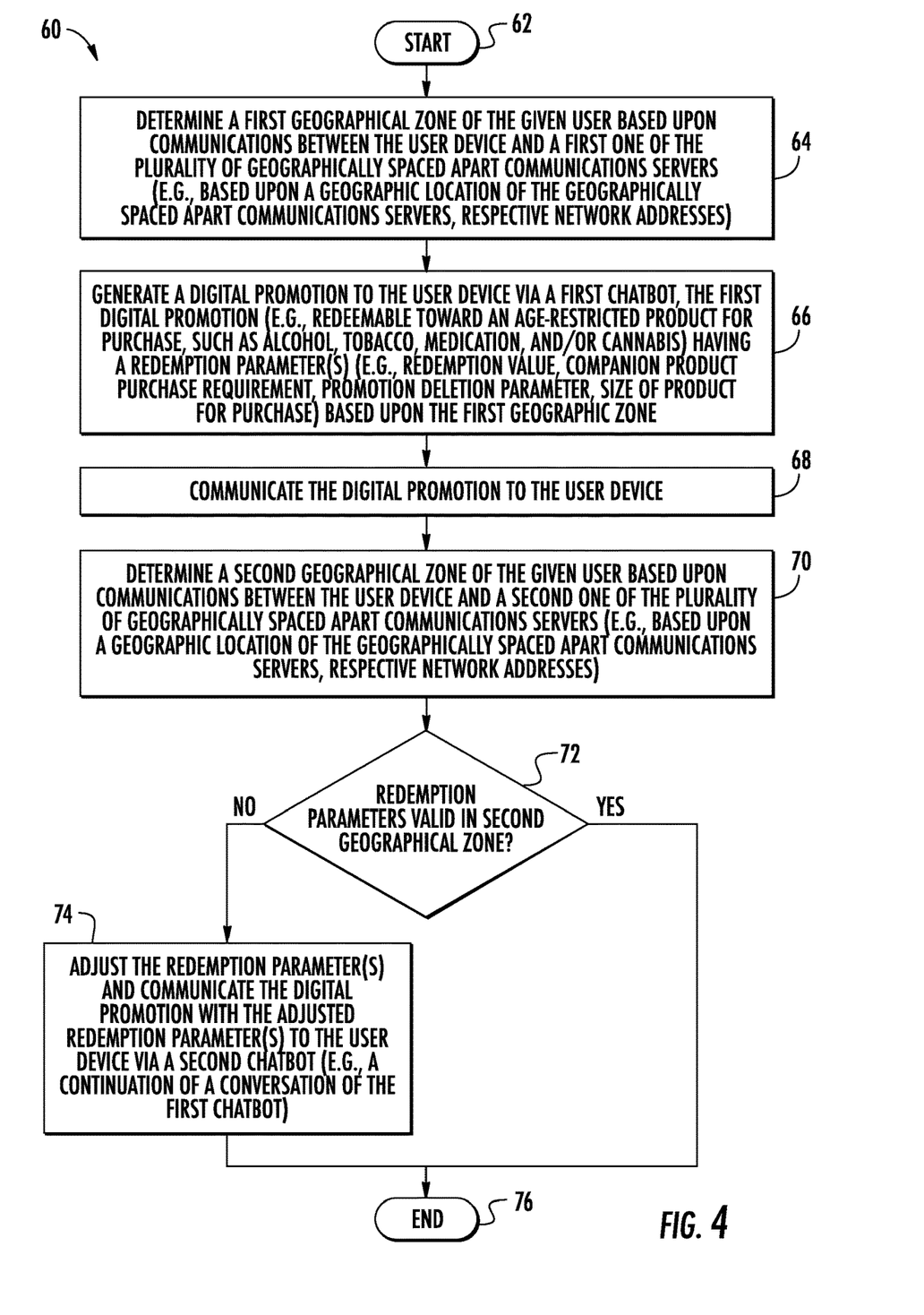
FIG. 4 is flow diagram illustrating operation of the promotion processing server of FIG. 3.

Referring now additionally to the flowchart 60 in FIG. 4, beginning at Block 62, operations of the promotion processing server 50 will now be described. The promotion processing server 50, at Block 64, determines a first geographic zone 22 of the given user based upon communications between the mobile wireless communications device 30 and a first geographically spaced apart communications server 40a. More particularly, the promotion processing server 50 may determine the first geographic zone 22 based upon a respective geographic location as determined by respective network addresses (e.g., along a communications path). In some embodiments, the promotion processing server 50 may determine the first geographic zone 22 based upon a look-up table, stored in the memory 52, of geographically spaced apart communications servers 40a-40n, their respective identifiers, and corresponding geographic locations.

For example, upon initiating a chatbot conversation, the mobile wireless communications device 30, which may be physically located in or within a threshold range from New York City, may initially be routed to the chatbot 41a executed on the first geographically spaced apart communications server 40a. The first geographically spaced apart communications server 40a may be the closest, geographically, to the mobile wireless communications device 30, and thus the routing of the chatbot conversation to the associated chatbot 41a. The promotion processing server 50 may store, for example, in the memory 52, metadata, such as network addresses and associated geographic locations, geographic locations and identifiers of wireless towers, WiFi networks, mobile device identifiers, times, etc.

At Block 66, the promotions processing server 50 generates a digital promotion 23. The digital promotion 23, which may be associated with the brand associated with the chatbots 41a-41n, may be redeemable toward a product for purchase. The product for purchase may an age-restricted product for purchase, such as, for example, any one or more of alcohol, tobacco, medication, and cannabis. Of course, the product for purchase may be another type of age-restricted product, as will be appreciated by those skilled in the art.

In an exemplary implementation, the chatbots 41a-41n may be associated with a beer brand (Brand-B Beer), and the chatbot conversation may relate to Brand-B Beer. The digital promotion 23 may be for $1.00 OFF a six-pack of Brand-B Beer.

The digital promotion 23 has redemption parameters 24 associated therewith that are based upon the first geographic zone 22. The redemption parameters 24 may include a redemption value (e.g., $1.00 OFF the six-pack of Brand-B Beer), a companion purchase requirement (e.g., $1.00 OFF a six-pack of Brand-B Beer and a family size bag of Chip-Brand Chips), a product size (e.g., 40-ounce bottle), and a deletion parameter. The deletion parameter may be in the form of a flag that when activating causes the deletion of the digital promotion from the chatbot conversation, as will be described in further detail below. There may be only one redemption parameter.

As will be appreciated by those skilled in the art, the first geographic zone 22 may have restrictions on the generating and communicating of promotions relating to the age-restricted product. Some geographic zones, which may be defined by state, city, county, etc., may permit digital promotions to be applied to age-restricted products so long as certain parameters are met. For example, a geographic zone may permit a digital promotion to be applied to an age-restricted product so long as the per container or package size is less than a threshold size, the redemption value is less than a threshold amount (e.g., dollar amount in terms of percentage and/or total product price), the promotion is applied when a non-restricted companion product is purchased, and/or restricted element percentage of total product (e.g., percent alcohol by volume, percent THC, etc.) is below a threshold. Some geographic zones may not permit application of a digital promotion to a restricted product at all.

The redemption parameters 24 may be set to be compliant within the first geographic zone 22. The promotion processing server 50 may alternatively or additionally determine whether the digital promotion 23, based upon the redemption parameters 24, is compliant in the first geographic zone 22. For example, the promotion processing server 50 may compare the redemption parameters 24 to stored parameters that represent requirements for a digital promotion of the age-restricted product for purchase in a given geographic zone (e.g., governing jurisdiction).

With respect to the implementation example above, the first geographic zone 22 (e.g., New York City) may permit promotions on alcohol-based products for purchase having less than 10% alcohol by volume. Since Brand-B Beer is 5.8% alcohol by volume, the digital promotion 23 of $1.00 OFF the six-pack of Brand-B Beer is permitted.

The digital promotion 23 is communicated to the mobile wireless communications device 30 (Block 68), for example, with redemption parameters 24 that are compliant in the first geographic zone 22. The digital promotion 23 is communicated via the first chatbot 41a with redemption parameters 24 compliant in the first geographic zone 22.

At Block 70, the promotion processing server 50 determines a second geographic zone 25 of the given user based upon communications between the mobile wireless communications device 30 and a second geographically spaced apart communications server 40b. The promotion processing server 50 may determine the second geographic zone 25 of the given user based upon the same determining techniques described above with respect to the first geographic zone 22.

With respect to the example above, while the given user may have initially been in New York City, the given user may have traveled to Texas as determined by the promotions processing server 50. The mobile wireless communications device 30, and more particularly, the chatbot conversation 36, may be re-routed based upon being in the second geographic zone 25 (e.g., Texas) to another chatbot 41b being executed on the corresponding geographically spaced apart communications server 40b. However, as it relates to the given user, the chatbot conversation 36 being conducted by the second chatbot 41b may appear as or be a continuation of the same chatbot conversation from the one the given user was in the first geographic zone 22 (e.g., New York). In other words, the changing of the chatbots 41a, 41b between the first and second geographic zones 22, 25 may be transparent to the given user.

The promotion processing server 50 determines whether the redemption parameters 24 of the digital promotion 23 is valid in the second geographic zone 25 (Block 72). When the redemption parameters 24 of the digital promotion 23 are valid in the second geographic zone 25, operations end at Block 76.

When, however, the redemption parameters 24 of the digital promotion 23 are not valid (Block 72), the promotion processing server 50 adjusts one or more of the redemption parameters and communicates the digital promotion to the mobile wireless communications device 30 via the second chatbot 41b (Block 74). With respect to the implementation example described above for $1.00 OFF a six-pack of Brand-B Beer that was permitted in the first geographic zone 22 (e.g., New York City), the same digital promotion 23 may be invalid in the second geographic zone 25 (e.g., Texas) unless the promotion is coupled with a companion non-restricted or non-age-restricted food product, such as, for example, potato chips. Thus the promotion processing server 50 may adjust the redemption parameter so that the digital promotion 23 is now $1.00 OFF the six-pack of Brand-B Beer when you purchase a family size bag of Chip-Brand Chips. The updated or adjusted digital promotion 23 appears as such on the display 35 of the mobile wireless communications device 30 in the chatbot conversation 36 (i.e., via the second chatbot 41b).

In some embodiments, the promotion processing server 50 may, via the second chatbot 41b and through the chatbot conversation 36, notify the given user that the digital promotion 23 has changed. In some embodiments, the original graphical display of the digital promotion 23, if any, may change within the chatbot conversation. Operations end at Block 76.

Figure 5:
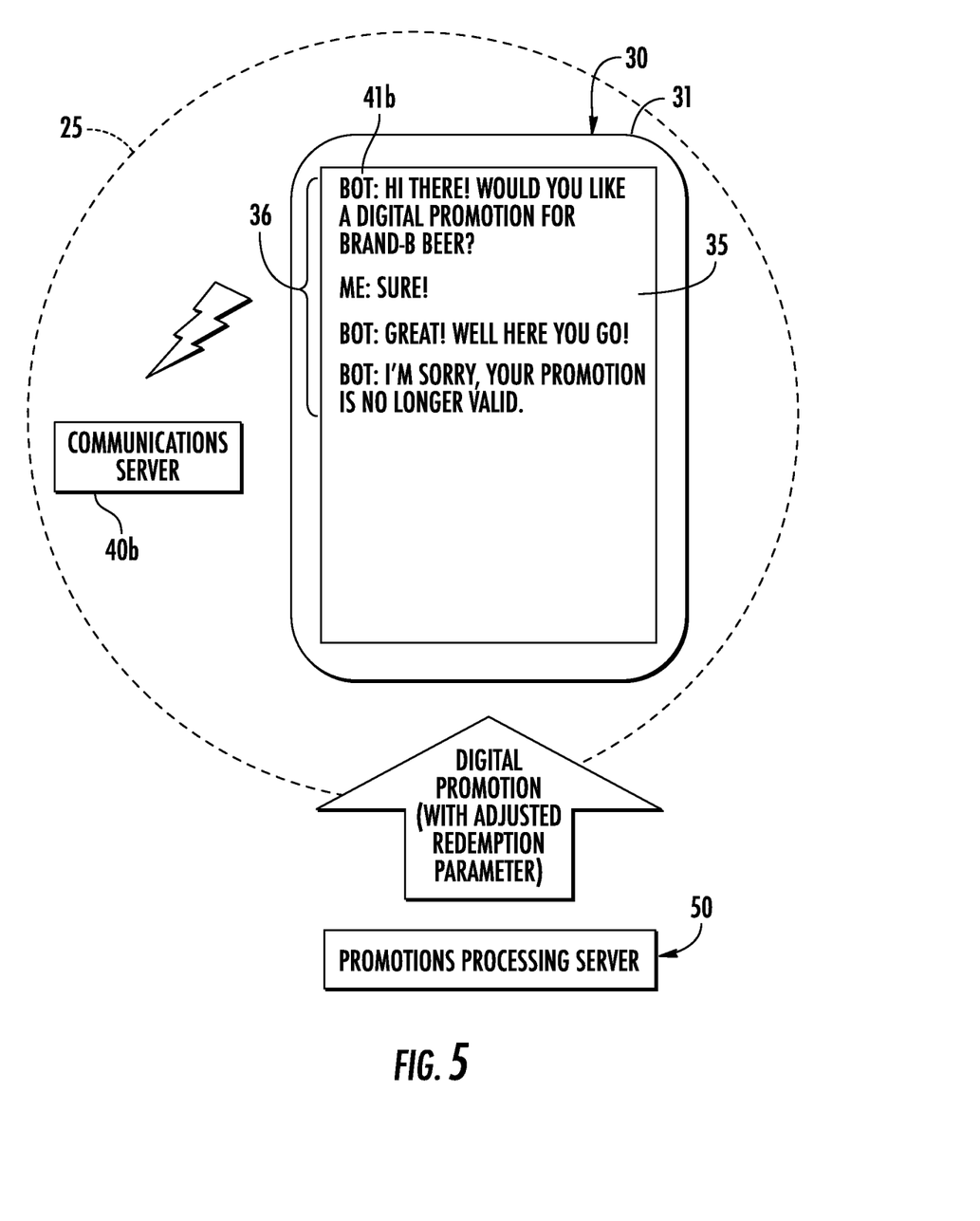
FIG. 5 is a schematic diagram of a portion of a promotion processing system in accordance with an embodiment.

Referring now to FIG. 5, the redemption parameter 24 may be a promotion deletion parameter. Accordingly, if the digital promotion 23 is not valid in the second geographic zone 25 (e.g., where digital promotions for age-restricted products are not permitted at all), the promotion processing server 50 may delete or remove the digital promotion from the chatbot conversation 36 via the second chatbot 41b. The promotion processing server 50 may, via the second chatbot 41b, and through the chatbot conversation 36, notify the given user that the digital promotion 23 has been deleted.

Figure 6:
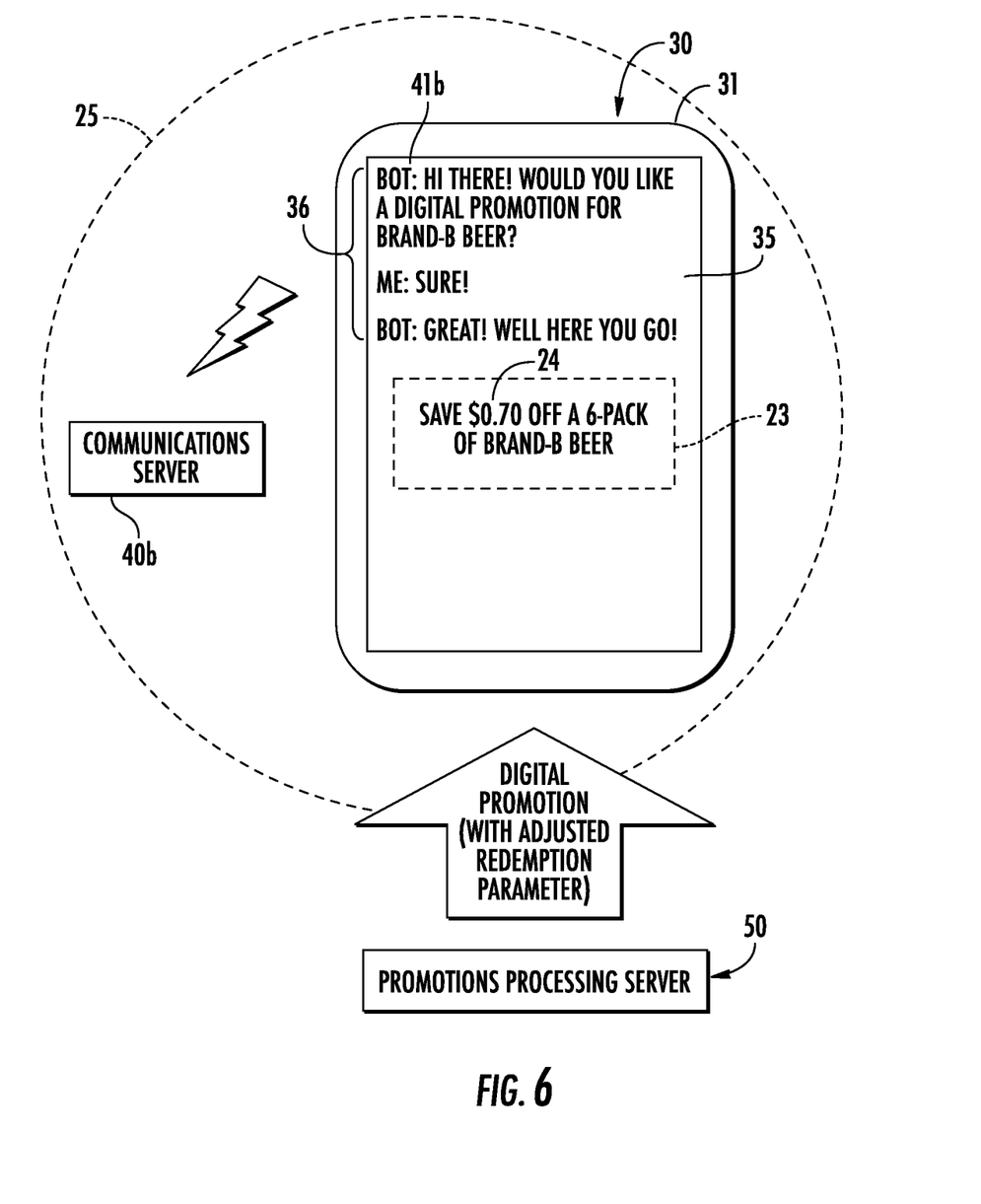
FIG. 6 is a schematic diagram of a portion of a promotion processing system in accordance with an embodiment.

Referring now to FIG. 6, the redemption parameter 24 may be a redemption value. For example, if the second geographic zone 25 permits digital promotions of age-restricted products for purchase, but not to exceed a threshold percentage of the sales price, the promotion processing server 50 may adjust the redemption value. With respect to the Brand-B Beer example, if the sales prices of a six-pack of Brand-B Beer is $6.99 and the digital promotion 23 shall not exceed 10% of the sales price, the promotion processing server 50 may adjust the digital promotion to have a redemption value of $0.70 OFF a six-pack of Brand-B Beer instead of $1.00 OFF the six-pack of Brand-Beer Beer.

While several implementation examples have been described herein with respect to changing a redemption parameter, those skilled in the art will appreciate that there may be any number of redemption parameters that may be adjusted to make a digital promotion valid. In some embodiments, there may be a single redemption parameter. Moreover, while embodiments have been described herein whereby a given user changes from a less restrictive geographic zone to a more restrictive geographic zone, redemption parameters may be adjusted for a less restrictive geographic zone (e.g., an increase in the redemption value).

As will be appreciated by those skilled in the art, the promotion processing system 20 may advantageously adjust one or more redemption parameters 24 to maintain validity, if possible, of a digital promotion 23 for age-restricted products for purchase. Thus, a given user may be able to maintain a digital promotion 23 for an age-restricted product for purchase when the given user travels or changes geographic zones 22, 25. The promotion processing system 20 also permits the given user to change geographic zones 22, 25, for example, that may have different valid redemption parameters 24 and communicating with different geographically spaced apart communications servers 40a-40n, while maintaining a chatbot conversation 36. In other words, the promotion processing system 20 provides continuity of or maintenance of a single chatbot conversation 36 as the given user communicates with different geographically spaced apart communications servers 40a-40n executing respective chatbots 41a-41n or chatbot instances and while adjusting for different valid redemption parameters 24.

A method aspect is directed to a method of processing a promotion. The method includes using a promotion processing server 50 to determine a first geographic zone 22 of a given user based upon communications between a user device 30 associated with the given user and a first one of a plurality of geographically spaced apart communications servers 40a-40n. The plurality of geographically spaced apart communications servers 40a-40n each are configured to execute a respective chatbot 41a-41n. The method also includes using the promotion processing server 50 to generate and communicate a digital promotion 23 to the user device 30 via a first chatbot 41a. The digital promotion 23 has a redemption parameter based on the first geographic zone 22. The method further includes using the promotion processing server 50 to determine a second geographic zone 25 of the given user based upon communications between the user device 30 and a second one of the plurality of geographically spaced apart communications servers 40b, and determine whether the redemption parameter of the digital promotion 23 is valid in the second geographic zone, and when not, adjust the redemption parameter and communicate the digital promotion with the adjusted redemption parameter to the user device via a second chatbot 41b.

A computer readable medium aspect is directed to a non-transitory computer readable medium for processing a promotion. The non-transitory computer readable medium includes computer executable instructions that when executed by a processor 51 cause the processor to perform operations. The operations include determining a first geographic zone 22 of a given user based upon communications between a user device 30 associated with the given user and a first one of a plurality of geographically spaced apart communications servers 40a. The plurality of geographically spaced apart communications servers 40a-40n are each configured to execute a respective chatbot 41a-41n. The operations further include generating and communicating a digital promotion 23 to the user device via a first chatbot 41a. The digital promotion 23 has a redemption parameter based on the first geographic zone 22. The operations further include determining a second geographic zone 25 of the given user based upon communications between the user device 30 and a second one of the plurality of geographically spaced apart communications servers 40b, and determining whether the redemption parameter of the digital promotion is valid in the second geographic zone 25, and when not, adjusting the redemption parameter and communicating the digital promotion 23 with the adjusted redemption parameter to the user device via a second chatbot 41b.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
a user device associated with a given user;
a plurality of geographically spaced apart communications servers each configured to execute a respective chatbot; and
a promotion processing server configured to
determine a first geographic zone of the given user based upon communications between the user device and a first one of the plurality of geographically spaced apart communications servers,
generate and communicate a digital promotion to the user device via a first chatbot, the digital promotion having a redemption parameter based on the first geographic zone,
determine a second geographic zone of the given user based upon communications between the user device and a second one of the plurality of geographically spaced apart communications servers, and
determine whether the redemption parameter of the digital promotion is valid in the second geographic zone, and when not, adjust the redemption parameter and communicate the digital promotion with the adjusted redemption parameter to the user device via a second chatbot.

2. The promotion processing system of claim 1 wherein the digital promotion is redeemable toward an age-restricted product for purchase; and wherein the promotion processing server is configured to determine whether the redemption parameter is valid in the second geographic zone based upon the age-restricted product for purchase.

3. The promotion processing system of claim 2 wherein the age-restricted product for purchase comprises at least one of alcohol, tobacco, medication, and cannabis.

4. The promotion processing system of claim 1 wherein the promotion processing server is configured to determine the first and second geographic zones based upon a geographic location of the plurality of geographically spaced apart communications servers.

5. The promotion processing system of claim 1 wherein the promotion processing server is configured to determine the first and second geographic zones based upon respective network addresses.

6. The promotion processing system of claim 1 wherein the second chatbot is configured to continue a chatbot conversation from the first chatbot.

7. The promotion processing system of claim 1 wherein the redemption parameter comprises a redemption value.

8. The promotion processing system of claim 1 wherein the redemption parameter comprises a companion product purchase requirement.

9. The promotion processing system of claim 1 wherein the redemption parameter comprises a promotion deletion parameter.

10. The promotion processing system of claim 1 wherein the digital promotion is redeemable toward a product for purchase; and wherein the redemption parameter comprises a size of the product for purchase.

11. A promotion processing server comprising:
a processor and an associated memory configured to
determine a first geographic zone of a given user based upon communications between a user device associated with the given user and a first one of a plurality of geographically spaced apart communications servers, the plurality of geographically spaced apart communications servers each configured to execute a respective chatbot,
generate and communicate a digital promotion to the user device via a first chatbot, the digital promotion having a redemption parameter based on the first geographic zone,
determine a second geographic zone of the given user based upon communications between the user device and a second one of the plurality of geographically spaced apart communications servers, and
determine whether the redemption parameter of the digital promotion is valid in the second geographic zone, and when not, adjust the redemption parameter and communicate the digital promotion with the adjusted redemption parameter to the user device via a second chatbot.

12. The promotion processing server of claim 11 wherein the digital promotion is redeemable toward an age-restricted product for purchase; and wherein the processor is configured to determine whether the redemption parameter is valid in the second geographic zone based upon the age-restricted product for purchase.

13. The promotion processing server of claim 12 wherein the age-restricted product for purchase comprises at least one of alcohol, tobacco, medication, and cannabis.

14. The promotion processing server of claim 11 wherein the processor is configured to determine the first and second geographic zones based upon a geographic location of the plurality of geographically spaced apart communications servers.

15. The promotion processing server of claim 11 wherein the promotion processing server is configured to determine the first and second geographic zones based upon respective network addresses.

16. The promotion processing server of claim 11 wherein the redemption parameter comprises at least one of a redemption value, a companion product purchase requirement, and a promotion deletion parameter.

17. A method of processing a promotion comprising:
using a promotion processing server to
determine a first geographic zone of a given user based upon communications between a user device associated with the given user and a first one of a plurality of geographically spaced apart communications servers, the plurality of geographically spaced apart communications servers each configured to execute a respective chatbot,
generate and communicate a digital promotion to the user device via a first chatbot, the digital promotion having a redemption parameter based on the first geographic zone,
determine a second geographic zone of the given user based upon communications between the user device and a second one of the plurality of geographically spaced apart communications servers, and
determine whether the redemption parameter of the digital promotion is valid in the second geographic zone, and when not, adjust the redemption parameter and communicate the digital promotion with the adjusted redemption parameter to the user device via a second chatbot.

18. The method of claim 17 wherein the digital promotion is redeemable toward an age-restricted product for purchase; and wherein using the promotion processing server comprises using the promotion processing server to determine whether the redemption parameter is valid in the second geographic zone based upon the age-restricted product for purchase.

19. The method of claim 18 wherein the age-restricted product for purchase comprises at least one of alcohol, tobacco, medication, and cannabis.

20. The method of claim 17 wherein using the promotion processing server comprises using the promotion processing server to determine the first and second geographic zones based upon a geographic location of the plurality of geographically spaced apart communications servers.

21. A non-transitory computer readable medium for processing a promotion, the non-transitory computer readable medium comprising computer executable instructions that when executed by a processor cause the processor to perform operations comprising:
determining a first geographic zone of a given user based upon communications between a user device associated with the given user and a first one of a plurality of geographically spaced apart communications servers, the plurality of geographically spaced apart communications servers each configured to execute a respective chatbot;
generating and communicating a digital promotion to the user device via a first chatbot, the digital promotion having a redemption parameter based on the first geographic zone;
determining a second geographic zone of the given user based upon communications between the user device and a second one of the plurality of geographically spaced apart communications servers; and
determining whether the redemption parameter of the digital promotion is valid in the second geographic zone, and when not, adjusting the redemption parameter and communicating the digital promotion with the adjusted redemption parameter to the user device via a second chatbot.

22. The non-transitory computer readable medium of claim 21 wherein the digital promotion is redeemable toward an age-restricted product for purchase; and wherein the operations comprise determining whether the redemption parameter is valid in the second geographic zone based upon the age-restricted product for purchase.

23. The non-transitory computer readable medium of claim 22 wherein the age-restricted product for purchase comprises at least one of alcohol, tobacco, medication, and cannabis.

24. The non-transitory computer readable medium of claim 21 wherein the operations comprise determining the first and second geographic zones based upon a geographic location of the plurality of geographically spaced apart communications servers.

* * * * *